US009064502B2

(12) United States Patent
Taal et al.

(10) Patent No.: US 9,064,502 B2
(45) Date of Patent: Jun. 23, 2015

(54) SPEECH INTELLIGIBILITY PREDICTOR AND APPLICATIONS THEREOF

(75) Inventors: Cees H. Taal, Delft (NL); Richard Hendriks, Delft (NL); Richard Heusdens, Delft (NL); Ulrik Kjems, Smørum (DK); Jesper Jensen, Smørum (DK)

(73) Assignee: OTICON A/S, Smorum (DK)

( * ) Notice: Subject to any disclaimer, the term of this patent is extended or adjusted under 35 U.S.C. 154(b) by 867 days.

(21) Appl. No.: 13/045,303

(22) Filed: Mar. 10, 2011

(65) Prior Publication Data

US 2011/0224976 A1 Sep. 15, 2011

Related U.S. Application Data

(60) Provisional application No. 61/312,692, filed on Mar. 11, 2010.

(30) Foreign Application Priority Data

Mar. 11, 2010 (EP) .................................... 10156220

(51) Int. Cl.
*G10L 21/02* (2013.01)
*G10L 15/16* (2006.01)
*G10L 25/69* (2013.01)

(52) U.S. Cl.
CPC ..................................... *G10L 25/69* (2013.01)

(58) Field of Classification Search
CPC .. H05K 999/99; G10L 19/02; G10L 19/0212; G10L 19/10; G10L 21/0208; G10L 21/0205; G10L 19/083; G10L 19/18; G11B 20/00007; H04B 1/667
USPC ......... 704/203, 204, 205, 206, 218, 224, 225, 704/E21.009
See application file for complete search history.

(56) References Cited

U.S. PATENT DOCUMENTS 5,473,701 A 12/1995 Cezanne et al.
7,483,831 B2 * 1/2009 Rankovic ...................... 704/225

FOREIGN PATENT DOCUMENTS

EP 1 241 663 A1 9/2002
EP 1460769 A1 9/2004

(Continued)

OTHER PUBLICATIONS

Chi et al., Spectro-temporal modulation transfer functions and speech intelligibility. Journal of the Acoustical Society of America. 106 (5). Nov. 1999. pp. 2719-2732.*

(Continued)

*Primary Examiner* — Brian Albertalli
(74) *Attorney, Agent, or Firm* — Birch, Stewart, Kolasch & Birch, LLP

(57) ABSTRACT

The application relates to a method of providing a speech intelligibility predictor value for estimating an average listener's ability to understand of a target speech signal when said target speech signal is subject to a processing algorithm and/or is received in a noisy environment. The application further relates to a method of improving a listener's understanding of a target speech signal in a noisy environment and to corresponding device units. The object of the present application is to provide an alternative objective intelligibility measure, e.g. a measure that is suitable for use in a time-frequency environment. The invention may e.g. be used in audio processing systems, e.g. listening systems, e.g. hearing aid systems.

27 Claims, 9 Drawing Sheets

(56) References Cited

FOREIGN PATENT DOCUMENTS

| | | | |
|---|---|---|---|
| EP | 1981253 | A1 | 10/2008 |
| EP | 2 048 657 | A1 | 4/2009 |
| EP | 2088802 | A1 | 8/2009 |
| WO | 99/09786 | A1 | 2/1999 |
| WO | WO 2008/125291 | A2 | 10/2008 |

OTHER PUBLICATIONS

Goldsworthy and Greenberg. Analysis of speech-based speech transmission index methods with implications for nonlinear operations. Journal of the Acoustical Society of America. 116 (6). Dec. 2004. pp. 3679-3689.*

Brand and Kollmeier. Efficient adaptive procedures for threshold and concurrent slope estimates for psychophysics and speech intelligibility tests. Journal of the Acoustical Society of America. 111 (6). Jun. 2002. pp. 2801-2810.*

Noordhoek and Drullman. Effect of reducing temporal intensity modulations on sentence intelligibility. Journal of the Acoustical Society of America. 101 (1). Jan. 1997. pp. 498-502.*

Deller, Hansen and Proakis. Discrete-Time Processing of Speech Signals. Wiley-Interscience-IEEE. 2000. p. 39. TK T882.S65 D44 2000 c.6.*

Benesty et al., Springer Handbook of Speech Processing, Springer Berlin Heidelberg, 2008, p. 70.*

Elhilali et al. (A spectro-temporal modulation index (STMI) for assessment of speech intelligibility, Speech Communication, vol. 41, 2003, p. 331-348).*

Deller et al., "Discrete-Time Processing of Speech Signals," IEEE Press Classic Reissue, 2000, 5 pages.

Domínguez, "Pre-Processing of Speech Signals for Noisy and Band-Limited Channels," Master's Degree Project, KTH Electrical Engineering, Stockholm, Sweden, Mar. 2009, 123 pages.

Ephraim et al., "Speech Enhancement Using a Minimum Mean-Square Error Short-Time Spectral Amplitude Estimator," IEEE Transactions on Acoustics, Speech, and Signal Processing, vol. ASSP-32, No. 6, Dec. 1984, pp. 1109-1121.

Gerven et al., "A Comparative Study of Speech Detection Methods," Eurospeech 97', 5th European Conference on Speech Communication and Technology, Rhodes, Greece, Sep. 22-25, 1997, 4 pages.

Hendriks et al., "MMSE Based Noise PSD Tracking With Low Complexity," IEEE International Conference on Acoustics Speech and Signal Processing, Mar. 2010, pp. 4266-4269.

Kawamura et al., "A Speech Spectral Estimator using Adaptive Speech Probability Density Function," 18th European Signal Processing Conference (EUSIPCO-2010), Aalborg, Denmark, Aug. 23-27, 2010, pp. 1549-1552.

Loizou, "Speech Enhancement, Theory and Practice," CRC Press, 2007, 4 pages.

Martin et al., "Noise Power Spectral Density Estimation Based on Optimal Smoothing and Minimum Statistics," IEEE Transactions on Speech and Audio Processing, vol. 9, No. 5, Jul. 2001, pp. 504-512.

Martin, "Speech Ehancement Based on Minimum Mean-Square Error Estimation and Supergaussian Priors," IEEE Transactions on Speech and Audio Processing, vol. 13, No. 5, Sep. 2005, pp. 845-856.

Rhebergen, K. et al. "A Speech Intelligibility Index-Based Approach to Predict the Speech Reception Threshold for Sentences in Fluctuating Noise for Normal-Hearing listeners", The Journal of The Acoustical Society of America, vol. 117, No. 4 Pt. 1, Apr. 2005, pp. 2181-2192. XP012072900.

Sauert et al. "Near End Listening Enhancement: Speech Intelligibility Improvement in Noisy Environments", Acoustics, Speech and Signal Processing, 2006, ICASSP 2006, Jan. 1, 2006, pp. I-493-I-496, XP031100334.

Sauert et al., "Near End Listening Enhancement Optimized With Repect to Speech Intelligibility Index," 17th European Signal Processing Conference (EUSIPCO 2009), Glasgow, Scotland, Aug. 24-28, 2009, pp. 1844-1848.

Sohn et al., "A Statistical Model-Based Voice Activity Detection," IEEE Signal Processing Letters, vol. 6, No. 1, Jan. 1999, pp. 1-3.

Taal et al. "An Evaluation of Objective Quality Measures for Speech Intelligibility Prediction" Interspeech 2009, Brighton, Sep. 6-10, 2009, pp. 1947-1950, XP009136320.

Taal et al., "A Short-Time Objective Intelligibility Measure for Time-Frequency Weighted Noisy Speech," IEEE International Conference on Acoustics Speech and Signal Processing (ICASSP), Mar. 14-19, 2010, pp. 4214-4217.

* cited by examiner

SPEECH INTELLIGIBILITY PREDICTOR AND APPLICATIONS THEREOF

This nonprovisional application claims the benefit under 35 USC §119(e) of U.S. Provisional Application No. 61/312,692 filed on Mar. 11, 2010 and under 35 USC §119(a) to European Patent Application No. 10156220.5 filed in the European Patent Office, on Mar. 11, 2010, all of which are hereby expressly incorporated by reference into the present application.

TECHNICAL FIELD

The present application relates to signal processing methods for intelligibility enhancement of noisy speech. The disclosure relates in particular to an algorithm for providing a measure of the intelligibility of a target speech signal when subject to noise and/or of a processed or modified target signal and various applications thereof. The algorithm is e.g. capable of predicting the outcome of an intelligibility test (i.e., a listening test involving a group of listeners). The disclosure further relates to an audio processing system, e.g. a listening system comprising a communication device, e.g. a listening device, such as a hearing aid (HA), adapted to utilize the speech intelligibility algorithm to improve the perception of a speech signal picked up by or processed by the system or device in question.

The application further relates to a data processing system comprising a processor and program code means for causing the processor to perform at least some of the steps of the method and to a computer readable medium storing the program code means.

The disclosure may e.g. be useful in applications such as audio processing systems, e.g. listening systems, e.g. hearing aid systems.

BACKGROUND ART

The following account of the prior art relates to one of the areas of application of the present application, hearing aids. Speech processing systems, such as a speech-enhancement scheme or an intelligibility improvement algorithm in a hearing aid, often introduce degradations and modifications to clean or noisy speech signals. To determine the effect of these methods on the speech intelligibility, a subjective listening test and/or an objective intelligibility measure (OIM) is needed. Such schemes have been developed in the past, cf. e.g. the articulation index (AI), the speech-intelligibility index (SII) (standardized as ANSI S3.5-1997), or the speech transmission index (STI).

DISCLOSURE OF INVENTION

Although the just mentioned OIMs are suitable for several types of degradation (e.g. additive noise, reverberation, filtering, clipping), it turns out that they are less appropriate for methods where noisy speech is processed by a time-frequency (TF) weighting. To analyze the effect of certain signal degradations on the speech-intelligibility in more detail, the OIM must be of a simple structure, i.e., transparent. However, some OIMs are based on a large amount of parameters which are extensively trained for a certain dataset. This makes these measures less transparent, and therefore less appropriate for these evaluative purposes. Moreover, OIMs are often a function of long-term statistics of entire speech signals, and do not use an intermediate measure for local short-time TF-regions.

With these measures it is difficult to see the effect of a time-frequency localized signal-degradation on the speech intelligibility.

The following three basic areas in which the intelligibility prediction algorithm can be used have been identified:

1) Online optimization of intelligibility given noisy signal(s) only (cf. Example 1).
2) Online algorithm optimization of intelligibility given target and disturbance signals in separation (cf. Example 2)
3) Offline optimization, e.g. for HA parameter tuning. In this application, the algorithm may replace a listening test with human subjects (cf. Example 3).

In this context, the term 'online' refers to a situation where an algorithm is executed in an audio processing system, e.g. a listening device, e.g. a hearing instrument, during normal operation (generally continuously) in order to process the incoming sound to the end-user's benefit. The term 'offline', on the other hand, refers to a situation where an algorithm is executed in an adaptation situation, e.g. during development of a software algorithm or during adaptation or fitting of a device, e.g. to a user's particular needs.

An object of the present application is to provide an alternative objective intelligibility measure. Another objet is to provide an improved intelligibility of a target signal in a noisy environment.

Objects of the application are achieved by the invention described in the accompanying claims and as described in the following.

A Method of Providing a Speech Intelligibility Predictor Value:

An object of the application is achieved by a method of providing a speech intelligibility predictor value for estimating an average listener's ability to understand a target speech signal when said target speech signal is subject to a processing algorithm and/or is received in a noisy environment, the method comprising a) Providing a time-frequency representation $x_j(m)$ of a first signal x(n) representing the target speech signal in a number of frequency bands and a number of time instances, j being a frequency band index and m being a time index;
b) Providing a time-frequency representation $y_j(m)$ of a second signal y(n), the second signal being a noisy and/or processed version of said target speech signal in a number of frequency bands and a number of time instances;
c) Providing first and second intelligibility prediction inputs in the form of time-frequency representations $x_j^*(m)$ and $y_j^*(m)$ of the first and second signals or signals derived there from, respectively;
d) Providing time-frequency dependent intermediate speech intelligibility coefficients $d_j(m)$ based on said first and second intelligibility prediction inputs;
e) Calculating a final speech intelligibility predictor d by averaging said intermediate speech intelligibility coefficients $d_j(m)$ over a number J of frequency indices and a number M of time indices;

This has the advantage of providing an objective intelligibility measure that is suitable for use in a time-frequency environment.

The term 'signals derived therefrom' is in the present context taken to include averaged or scaled (e.g. normalized) or clipped versions s* of the original signal s, or e.g. non-linear transformations (e.g. log or exponential functions) of the original signal.

In a particular embodiment, the method comprises determining whether or not an electric signal representing audio comprises a voice signal (at a given point in time). A voice signal is in the present context taken to include a speech signal from a human being. It may also include other forms of utterances generated by the human speech system (e.g. singing). In an embodiment, the voice activity detector (VAD) is adapted to classify a current acoustic environment of the user as a VOICE or NO-VOICE environment. This has the advantage that time segments of the electric signal comprising human utterances (e.g. speech) can be identified, and thus separated from time segments only comprising other sound sources (e.g. artificially generated noise). Preferably time frames comprising non-voice activity are deleted from the signal before it is subjected to the speech intelligibility prediction algorithm so that only time frames containing speech are processed by the algorithm. Algorithms for voice activity detection are e.g. discussed in [4], pp. 399, and [16], [17].

In a particular embodiment, the method comprises in step d) that the intermediate speech intelligibility coefficients $d_j(m)$ are average values over a predefined number N of time indices.

In a particular embodiment, M is larger than or equal to N. In a particular embodiment, the number M of time indices is determined with a view to a typical length of a phoneme or a word or a sentence. In a particular embodiment, the number M of time indices correspond to a time larger than 100 ms, such as larger than 400 ms, such as larger than 1 s, such as in the range from 200 ms to 2 s, such as larger than 2 s, such as in a range from 100 ms to 5 s. In a particular embodiment, the number M of time indices is larger than 10, such as larger than 50, such as in the range from 10 to 200, such as in the range from 30 to 100. In an embodiment, M is predefined. Alternatively, M can de dynamically determined (e.g. depending on the type of speech (short/long words, language, etc.)).

In a particular embodiment, the time-frequency representation s(k,m) of a signal s(n) comprises values of magnitude and/or phase of the signal in a number of DFT-bins defined by indices (k,m), where k=1, . . . , K represents a number K of frequency values and m=1, . . . , $M_x$ represents a number $M_x$ of time frames, a time frame being defined by a specific time index m and the corresponding K DFT-bins. This is e.g. illustrated in FIG. 1 and may be the result of a discrete Fourier transform of a digitized signal arranged in time frames, each time frame comprising a number of digital time samples $s_q$ of the input signal (amplitude) at consecutive points in time $t_q=q^*(1/f_s)$, q is a sample index, e.g. an integer q=1, 2, . . . indicating a sample number, and $f_s$ is a sampling rate of an analogue to digital converter.

In a particular embodiment, a number J of frequency sub-bands with sub-band indices j=1, 2, . . . , J is defined, each sub-band comprising one or more DFT-bins, the j'th sub-band e.g. comprising DFT-bins with lower and upper indices k1(*j*) and k2(*j*), respectively, defining lower and upper cut-off frequencies of the j'th sub-band, respectively, a specific time-frequency unit (j,m) being defined by a specific time index m and said DFT-bin indices k1(*j*)-k2(*j*), cf. e.g. FIG. 1.

In a particular embodiment, effective amplitudes of a signal $s_j$ of the j'th time-frequency unit at time instant m is given by the square root of the energy content of the signal in that time-frequency unit. The effective amplitudes $s_j$ of a signal s can be determined in a variety of ways, e.g. using a filterbank implementation or a DFT-implementation.

In a particular embodiment, effective amplitudes of a signal $s_j$ of the j'th time-frequency unit at time instant m is given by the following formula $$s_j(m) = \sqrt{\sum_{k=k1(j)}^{k2(j)} |s(k, m)|^2}$$

In a particular embodiment, the speech intelligibility coefficients $d_j(m)$ at given time instants m are calculated as a distance measure between specific time-frequency units of a target signal and a noisy and/or processed target signal.

In a particular embodiment, the speech intelligibility coefficients $d_j(m)$ at given time instants m are calculated as $$d_j(m) = \frac{\sum_{n=N1}^{N2} \left(x_j^*(n) - r_{x_j^*}\right)\left(y_j^*(n) - r_{y_j^*}\right)}{\sqrt{\sum_{n=N1}^{N2} \left(x_j^*(n) - r_{x_j^*}\right)^2 \sum_{n=N1}^{N2} \left(y_j^*(n) - r_{y_j^*}\right)^2}}$$

where $x_j^*(n)$ and $y_j^*(n)$ are the effective amplitudes of the j'th time-frequency unit at time instant n of the first and second intelligibility prediction inputs, respectively, and where N1≤m≤N2 and $r_{x*j}$ and $r_{y*j}$ are constants.

In a particular embodiment, the constants $r_{x*j}$ and $r_{y*j}$ are average values of the effective amplitudes of signals x* and y* over N=N2−N1 time instances $$r_{x_j^*} = \mu_{x_j^*} = \frac{1}{N}\sum_{l=N1}^{N2} x_j^*(l) \text{ and } r_{y_j^*} = \mu_{y_j^*} = \frac{1}{N}\sum_{l=N1}^{N2} y_j^*(l).$$

In a particular embodiment, $r_{x*j}$ and/or $r_{y*j}$ is/are equal to zero.

In a particular embodiment, the effective amplitudes $y^*_j(m)$ of the second intelligibility prediction input are normalized versions of the second signal with respect to the (first) target signal $x_j(m)$, $y^*_j=\tilde{y}_j=y_j(m)\cdot\alpha_j(m)$, where the normalization factor $\alpha_j$ is given by $$\alpha_j(m) = \left(\frac{\sum_{n=m-N+1}^{m} x_j(n)^2}{\sum_{n=m-N+1}^{m} y_j(n)^2}\right)^{\frac{1}{2}}.$$

In a particular embodiment, the normalized effective amplitudes $\tilde{y}_j$ of the second signal are clipped to provide clipped effective amplitudes $y^*_j$, where $$y^*_j(m)=\max(\min(\tilde{y}_j(m),x_j(m)+10^{-\beta/20}x_j(m)),x_j(m)-10^{-\beta/20}x_j(m)),$$

to ensure that the local target-to-interference ratio does not exceed β dB. In a particular embodiment, β is in the range from −50 to −5, such as between −20 and −10.

In a particular embodiment, N is larger than 10, e.g. in a range between 10 and 1000, e.g. between 10 and 100, e.g. in the range from 20 to 60. In a particular embodiment, N1=m−N+1 and N2=m to include the present and previous N−1 time instances in the determination of the intermediate speech intelligibility coefficients $d_j(m)$. In a particular embodiment, N1=m−N/2+1 and N2=N/2 to include a symmetric range of time instances around the present time instance in the determination of the intermediate speech intelligibility coefficients $d_j(m)$.

In a particular embodiment, $x_j^*(n)=x_j(n)$ (i.e. no modification of the time-frequency representation of the first signal). In a particular embodiment, $y_j^*(n)=y_j(n)$ (i.e. no modification of the time-frequency representation of the first signal).

In a particular embodiment, the speech intelligibility coefficients $d_j(m)$ at given time instants m are calculated as $$d_j(m) = \frac{\sum_{n=m-N+1}^{m} x_j(n)y_j(n)}{\sqrt{\sum_{n=m-N+1}^{m} (x_j(n))^2 \sum_{n=m-N+1}^{m} (y_j(n))^2}}$$

where $x_j(n)$ and $y_j(n)$ are the effective amplitudes of the j'th time-frequency unit at time instant n of the second and improved signal or a signal derived there from, respectively, and where N−1 is a number time instances prior to the current one included in the summation.

In a particular embodiment, the final intelligibility predictor d is transformed to an intelligibility score D' by applying a logistic transformation to d. In a particular embodiment, the logistic transformation has the form $$D' = \frac{100}{1 + \exp(ad + b)},$$

where a and b are constants. This has the advantage of providing an intelligibility measure in %.

A Method of Improving a Listener's Understanding of a Target Speech Signal in a Noisy Environment:

In aspect, a method of improving a listener's understanding of a target speech signal in a noisy environment is furthermore provided. The method comprises

- Providing a final speech intelligibility predictor d according to the method of providing a speech intelligibility predictor value described above, in the detailed description of 'mode(s) for carrying out the invention' and in the claims;
- Determining an optimized set of time-frequency dependent gains $g_j(m)_{opt}$, which when applied to the first or second signal or to a signal derived there from, provides a maximum final intelligibility predictor $d_{max}$.
- Applying said optimized time-frequency dependent gains $g_j(m)_{opt}$ to said first or second signal or to a signal derived there from, thereby providing an improved signal $o_j(m)$.

This has the advantage that a target speech signal can be optimized with respect to intelligibility when perceived in a noisy environment.

In a particular embodiment, the first signal x(n) is provided to the listener in a mixture with noise from said noisy environment in form of a mixed signal z(n). The mixed signal may e.g. be picked up by a microphone system of a listening device worn by the listener.

In a particular embodiment, the method comprises

- Providing a statistical estimate of the electric representations x(n) of the first signal and z(n) of the mixed signal,
- Using the statistical estimates of the first and mixed signal to estimate the intermediate speech intelligibility coefficients $d_j(m)$.

In a particular embodiment, the step of providing a statistical estimate of the electric representations x(n) and z(n) of the first and mixed signal, respectively, comprises providing an estimate of the probability distribution functions (pdf) of the underlying time-frequency representation $x_j(m)$ and $z_j(m)$ of the first and mixed signal, respectively.

In a particular embodiment, the final speech intelligibility predictor value is maximized using a statistically expected value D of the intelligibility coefficient, where $$D = E[d] = E\left[\frac{1}{JM}\sum_{j,m} d_j(m)\right] = \frac{1}{JM}\sum_{j,m} E[d_j(m)],$$

and where E[•] is the statistical expectation operator and where the expected values $E[d_j(m)]$ depend on statistical estimates, e.g. the probability distribution functions, of the underlying random variables $x_j(m)$.

In a particular embodiment, a time-frequency representation $z_j(m)$ of the mixed signal z(n) is provided.

In a particular embodiment, the optimized set of time-frequency dependent gains $g_j(m)_{opt}$ are applied to the mixed signal $z_j(m)$ to provide the improved signal $o_j(m)$.

In a particular embodiment, the second signal comprises, such as is equal to, the improved signal $o_j(m)$.

In a particular embodiment, the first signal x(n) is provided to the listener as a separate signal. In a particular embodiment, the first signal x(n) is wirelessly received at the listener. The target signal x(n) may e.g. be picked up by wireless receiver of a listening system worn by the listener.

In a particular embodiment, a noise signal w(n) comprising noise from the environment is provided to the listener. The noise signal w(n) may e.g. be picked up by a microphone system of a listening system worn by the listener.

In a particular embodiment, the noise signal w(n) is transformed to a signal w'(n) representing the noise from the environment at the listener's eardrum.

In a particular embodiment, a time-frequency representation $w_j(m)$ of the noise signal w(n) or of the transformed noise signal w'(n) is provided.

In a particular embodiment, the optimized set of time-frequency dependent gains $g_j(m)_{opt}$ are applied to the first signal $x_j(m)$ to provide the improved signal $o_j(m)$.

In a particular embodiment, the second signal comprises the improved signal $o_j(m)$ and the noise signal $w_j(m)$ or $w'_j(m)$ comprising noise from the environment. In a particular embodiment, the second signal is equal to the sum or to a weighted sum of the two signals $o_j(m)$ and $w_j(m)$ or $w'_j(m)$.

A Speech Intelligibility Predictor (SIP) Unit:

In an aspect, a speech intelligibility predictor (SIP) unit adapted for receiving a first signal x representing a target speech signal and a second noise signal y being either a noisy and/or processed version of the target speech signal, and for providing a as an output a speech intelligibility predictor value d for the second signal is furthermore provided. The speech intelligibility predictor unit comprises

- A time to time-frequency conversion (T-TF) unit adapted for
  - Providing a time-frequency representation $x_j(m)$ of a first signal x(n) representing said target speech signal in a number of frequency bands and a number of time instances, j being a frequency band index and m being a time index; and
  - Providing a time-frequency representation $y_j(m)$ of a second signal y(n), the second signal being a noisy and/or processed version of said target speech signal in a number of frequency bands and a number of time instances;

A transformation unit adapted for providing first and second intelligibility prediction inputs in the form of time-frequency representations $x_j^*(m)$ and $y_j^*(m)$ of the first and second signals or signals derived there from, respectively;

An intermediate speech intelligibility calculation unit adapted for providing time-frequency dependent intermediate speech intelligibility coefficients dim) based on said first and second intelligibility prediction inputs;

A final speech intelligibility calculation unit adapted for calculating a final speech intelligibility predictor d by averaging said intermediate speech intelligibility coefficients $d_j(m)$ over a predefined number J of frequency indices and a predefined number M of time indices.

It is intended that the process features of the method of providing a speech intelligibility predictor value described above, in the detailed description of 'mode(s) for carrying out the invention' and in the claims can be combined with the SIP-unit, when appropriately substituted by a corresponding structural feature. Embodiments of the SIP-unit have the same advantages as the corresponding method.

In an embodiment, a speech intelligibility predictor unit is provided which is adapted to calculate the speech intelligibility predictor value according to the method described above, in the detailed description of 'mode(s) for carrying out the invention' and in the claims.

A Speech Intelligibility Enhancement (SIE) Unit:

In an aspect, a speech intelligibility enhancement (SIE) unit adapted for receiving EITHER (A) a target speech signal x and (B) a noise signal w OR (C) a mixture z of a target speech signal and a noise signal, and for providing an improved output o with improved intelligibility for a listener is furthermore provided. The speech intelligibility enhancement unit comprises A speech intelligibility predictor unit as described above, in the detailed description of 'mode(s) for carrying out the invention' and in the claims;

A time to time-frequency conversion (T-TF) unit for providing a time-frequency representation $w_j(m)$ of said noise signal w(n) OR $z_j(m)$ of said mixed signal z(n) in a number of frequency bands and a number of time instances;

An intelligibility gain (IG) unit for

Determining an optimized set of time-frequency dependent gains $g_j(m)_{opt}$, which when applied to the first or second signal or to a signal derived there from, provides a maximum final intelligibility predictor $d_{max}$;

Applying said optimized time-frequency dependent gains $g_j(m)_{opt}$ to said first or second signal or to a signal derived there from, thereby providing an improved signal $o_j(m)$.

It is intended that the process features of the method of improving a listener's understanding of a target speech signal in a noisy environment described above, in the detailed description of 'mode(s) for carrying out the invention' and in the claims can be combined with the SIE-unit, when appropriately substituted by a corresponding structural feature. Embodiments of the SIE-unit have the same advantages as the corresponding method.

In a particular embodiment, the intelligibility enhancement unit is adapted to implement the method of improving a listener's understanding of a target speech signal in a noisy environment as described above, in the detailed description of 'mode(s) for carrying out the invention' and in the claims.

An Audio Processing Device:

In an aspect, an audio processing device comprising a speech intelligibility enhancement unit as described above, in the detailed description of 'mode(s) for carrying out the invention' and in the claims is furthermore provided.

In a particular embodiment, the audio processing device further comprises a time-frequency to time (TF-T) conversion unit for converting said improved signal (Dim), or a signal derived there from, from the time-frequency domain to the time domain.

In a particular embodiment, the audio processing device further comprises an output transducer for presenting said improved signal in the time domain as an output signal perceived by a listener as sound. The output transducer can e.g. be loudspeaker, an electrode of a cochlear implant (CI) or a vibrator of a bone-conducting hearing aid device.

In a particular embodiment, the audio processing device comprises an entertainment device, a communication device or a listening device or a combination thereof. In a particular embodiment, the audio processing device comprises a listening device, e.g. a hearing instrument, a headset, a headphone, an active ear protection device, or a combination thereof.

In an embodiment, the audio processing device comprises an antenna and transceiver circuitry for receiving a direct electric input signal (e.g. comprising a target speech signal). In an embodiment, the listening device comprises a (possibly standardized) electric interface (e.g. in the form of a connector) for receiving a wired direct electric input signal. In an embodiment, the listening device comprises demodulation circuitry for demodulating the received direct electric input to provide the direct electric input signal representing an audio signal.

In an embodiment, the listening device comprises a signal processing unit for enhancing the input signals and providing a processed output signal. In an embodiment, the signal processing unit is adapted to provide a frequency dependent gain to compensate for a hearing loss of a listener.

In an embodiment, the audio processing device comprises a directional microphone system adapted to separate two or more acoustic sources in the local environment of a listener using the audio processing device. In an embodiment, the directional system is adapted to detect (such as adaptively detect) from which direction a particular part of the microphone signal originates. This can be achieved in various different ways as e.g. described in U.S. Pat. No. 5,473,701 or in WO 99/09786 A1 or in EP 2 088 802 A1.

In an embodiment, the audio processing device comprises a TF-conversion unit for providing a time-frequency representation of an input signal. In an embodiment, the time-frequency representation comprises an array or map of corresponding complex or real values of the signal in question in a particular time and frequency range (cf. e.g. FIG. 1). In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the frequency domain. In an embodiment, the frequency range considered by the audio processing device from a minimum frequency $f_{min}$ to a maximum frequency $f_{max}$ comprises a part of the typical human audible frequency range from 20 Hz to 20 kHz, e.g. from 20 Hz to 12 kHz. In an embodiment, the frequency range $f_{min}$-$f_{max}$ considered by the audio processing device is split into a number J of frequency bands (cf. e.g. FIG. 1), where J is e.g. larger than 2, such as larger than 5, such as larger than 10, such as larger than 50, such as larger than 100, at least some of which are processed individually. Possibly different band split configurations are used for different functional blocks/algorithms of the audio processing device.

In an embodiment, the audio processing device further comprises other relevant functionality for the application in question, e.g. acoustic feedback suppression, compression, etc.

A Tangible Computer-Readable Medium:

A tangible computer-readable medium storing a computer program comprising program code means for causing a data processing system to perform at least some (such as a majority or all) of the steps of the method of providing a speech intelligibility predictor value described above, in the detailed description of 'mode(s) for carrying out the invention' and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

A data processing system comprising a processor and program code means for causing the processor to perform at least some (such as a majority or all) of the steps of the method of providing a speech intelligibility predictor value described above, in the detailed description of 'mode(s) for carrying out the invention' and in the claims is furthermore provided by the present application. In a particular embodiment, the processor is a processor of an audio processing device, e.g. a communication device or a listening device, e.g. a hearing instrument.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

Intelligibility Prediction Algorithm

The algorithm uses as input a target (noise free) speech signal x(n), and a noisy/processed signal y(n); the goal of the algorithm is to predict the intelligibility of the noisy/processed signal y(n) as it would be judged by group of listeners, i.e. an average listener.

Figure 1:
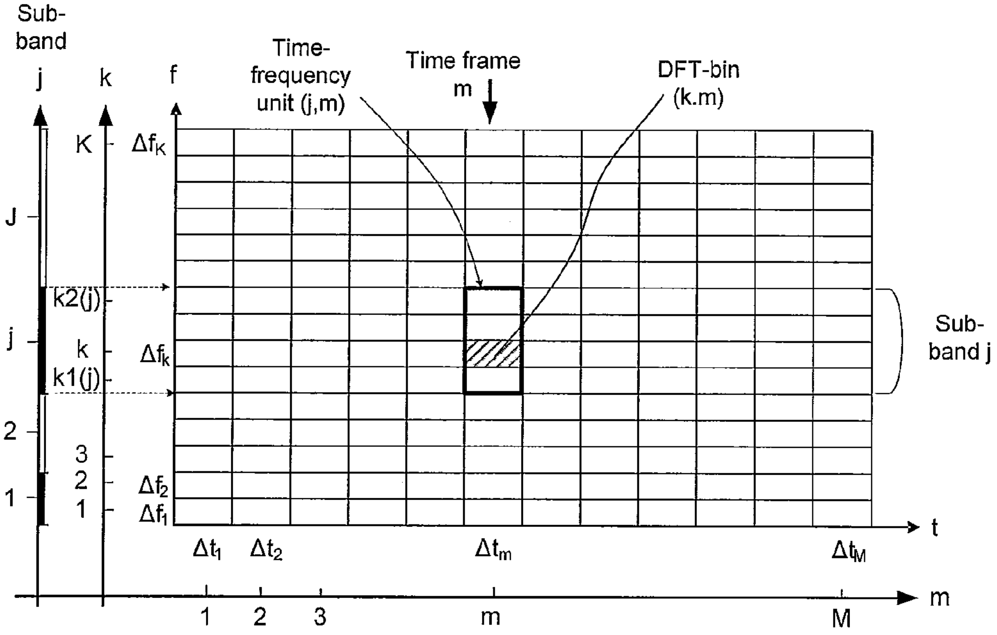
FIG. 1 schematically shows a time-frequency map representation of a time variant electric signal.

First, a time-frequency representation is obtained by segmenting both signals into (e.g. 20-70%, such as 50%) overlapping, windowed frames; normally, some tapered window, e.g. a Hanning-window is used. The window length could e.g. be 256 samples when the sample rate is 10000 Hz. In this case, each frame is zero-padded to 512 samples and Fourier transformed using the discrete Fourier transform (DFT), or a corresponding fast Fourier transform (FFT). Then, the resulting DFT bins are grouped in perceptually relevant sub-bands. In the following we use one-third octave bands, but it should be clear that any other sub-band division can be used. In the case of one-third octave bands and a sampling rate of 10000 Hz, there are 15 bands which cover the frequency range 150-5000 Hz. Other numbers of bands and another frequency range can be used depending on the specific application. If e.g. the sample rate is changed, optimal numbers of frame length, window overlap, etc. can advantageously be adapted. We refer to the time-frequency tiles defined by the time frames (1, 2, . . . , M) and sub-bands (1, 2, . . . , J) (cf. FIG. 1) as time-frequency (TF) units, as indicated in FIG. 1. A time-frequency tile defined by one of the K frequency values (1, 2, . . . , K) and one of the M time frames (1, 2, . . . , M) is termed a DFT bin (or DFT coefficient). In a typical DFT application, the individual DFT bins have identical extension in time and frequency (meaning that $\Delta t_t=\Delta t_2= \ldots =\Delta t_m=\Delta t$, and that $\Delta f_t=\Delta f_2= \ldots =\Delta f_M=\Delta f$, respectively).

Let x(k,m) and y(k,m) denote the k'th DFT-coefficient of the m'th frame of the clean target signal and the noisy/processed signal, respectively. The "effective amplitude" of the j'th TF unit in frame m is defined as $$x_j(m) = \sqrt{\sum_{k=k1(j)}^{k2(j)} |x(k, m)|^2}, \quad \text{(Eq. 1)}$$

where k1(*j*) and k2(*j*) denote DFT bin indices corresponding to lower and higher cut-off frequencies of the j'th sub-band. In the present example, the sub-bands do not overlap. Alternatively, the sub-bands may be adapted to overlap. The effective amplitude $y_j(m)$ of the j'th TF unit in frame m of the noisy/processed signal is defined similarly.

The noisy/processed amplitudes $y_j(m)$ can be normalized and clipped as described in the following. A normalization constant $\alpha_j(m)$ is computed as $$\alpha_j(m) = \left( \frac{\sum_{n=m-N+1}^{m} x_j(n)^2}{\sum_{n=m-N+1}^{m} y_j(n)^2} \right)^{\frac{1}{2}}, \quad \text{(Eq. 2)}$$

and a scaled version of $y_j(m)$ is formed $$\tilde{y}_j(m)=y_j(m)\alpha_j(m).$$

This local scaling ensures that the energy of $\tilde{y}(m)$ and $x_j(m)$ is the same (in the time-frequency region in question). Then, a clipping operation can be applied to $\tilde{y}_j(m)$:

$$y'_j(m)=\max(\min(\tilde{y}_j(m),x_j(m)+10^{-\beta/20}x_j(m)),x_j(m)-10^{-\beta/20}x_j(m)), \quad \text{(Eq. 3)}$$

to ensure that the local target-to-interference ratio does not exceed β dB. With a sampling rate of 10 kHz, it has been found that a value of β=−15 works well, cf. [1].

An intermediate intelligibility coefficient $d_j(m)$ related to the j'th TF unit of frame m is computed as $$d_j(m) = \frac{\sum_{n=m-N+1}^{m} \left(x_j(n) - \mu_{x_j}\right)\left(y'_j(n) - \mu_{y'_j}\right)}{\sqrt{\sum_n \left(x_j(n) - \mu_{x_j}\right)^2 \sum_n \left(y'_j(n) - \mu_{y'_j}\right)^2}} \quad \text{(Eq. 4)}$$

where $$\mu_{x_j} = \frac{1}{N}\sum_l x_j(l), \text{ and } \mu_{y'_j} = \frac{1}{N}\sum_l y'_j(l),$$

and where $y'_j(m)$ is the normalized and potentially clipped version of $y_j(m)$. The summations here are over frame indices including the current and N−1 past, i.e., N frames in total. Simulation experiments show that choosing N corresponding to 400 ms gives good performance; with a sample rate of 10000 Hz (and the analysis window settings mentioned above), this corresponds to N=30 frames.

The expression for $d_j(m)$ in Eq. (1) above has been verified to work well. Further experiments have shown that variants of this expression work well too. The mathematical structure of these variants is, however, slightly different. The optimization procedures outlined in the following sections may be easier to execute in practice with such variants than with the expression for $d_j(m)$ in Eq. (1). One particular variant of the intermediate intelligibility coefficient $d_j$ which has shown good performance is $$d_j(m) = \sum_{n=m-N+1}^{m} \left( \frac{x_j(n) - \mu_{x_j}}{\sqrt{\sum_n \left(x_j(n) - \mu_{x_j}\right)^2}} - \frac{y_j(n) - \mu_{y_j}}{\sqrt{\sum_n \left(y_j(n) - \mu_{y_j}\right)^2}} \right)^2, \quad \text{(Eq. 5)}$$

where $\mu_{x_j}$ and $\mu_{y'_j}$ are defined as above.

Other useful variants include the case where the clipping operation described above applied to $y_j(m)$ to obtain $y'_j(m)$ is omitted, and variants where the mean values $\mu_{x_j}$ and $\mu_{y'_j}$ are simply set to 0 in the expressions for $d_j(m)$.

From the intermediate intelligibility coefficients $d_j(m)$, a final intelligibility coefficient d for the sentence in question is computed as the following average, i.e., $$d = \frac{1}{JM}\sum_{j,m} d_j(m), \quad \text{(Eq. 6)}$$

where M is the total number of frames and J the total number of sub-bands (e.g. one-third octave bands) in the sentences. Ideally, the summation over frame indices m is performed only over signal frames containing target speech energy, that is, frames without speech energy are excluded from the summation. In practice, it is possible to estimate which signal frames contain speech energy using a voice activity detection algorithm. Usually, M>N, but this is not strictly necessary for the algorithm to work.

As described in [1] one can transform the intelligibility coefficient d to and intelligibility score (in %) by applying a logistic transformation to d. For example, the following transformation has been shown to work well (in the context of the present algorithm):

$$D' = \frac{100}{1 + \exp(ad + b)}, \quad \text{(Eq. 7)}$$

where the constants are given by a=−13.1903, and b=6.5192. In other contexts, e.g. different sampling rates, these constants may be chosen differently. Other transformations than the logistic function shown above may also be used, as long as there exists a monotonic relation between D' and d; another possible transformation uses a cumulative Gaussian function.

Figure 2A:
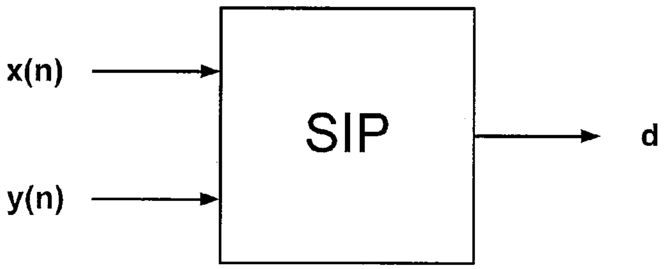
FIG. 2 shows an embodiment of a speech intelligibility predictor (SIP) unit according to the present application.

The elements of the speech intelligibility predictor SIP is sketched in FIG. 2. FIG. 2*a* simply shows the SIP unit having two inputs x and y and one output d. First signal x(n) and second signal y(n) are time variant electric signals representing acoustic signals, where time is indicated by index n (also implicating a digitized signal, e.g. digitized by an analogue to digital (ND) converter with sampling frequency $f_s$). The first signal x(n) is an electric representation of the target signal (preferably a clean version comprising no or insignificant noise elements). The second signal y(n) is a noisy and/or processed version of the target signal, processed e.g. by a signal processing algorithm, e.g. a noise reduction algorithm.

Figure 2B:
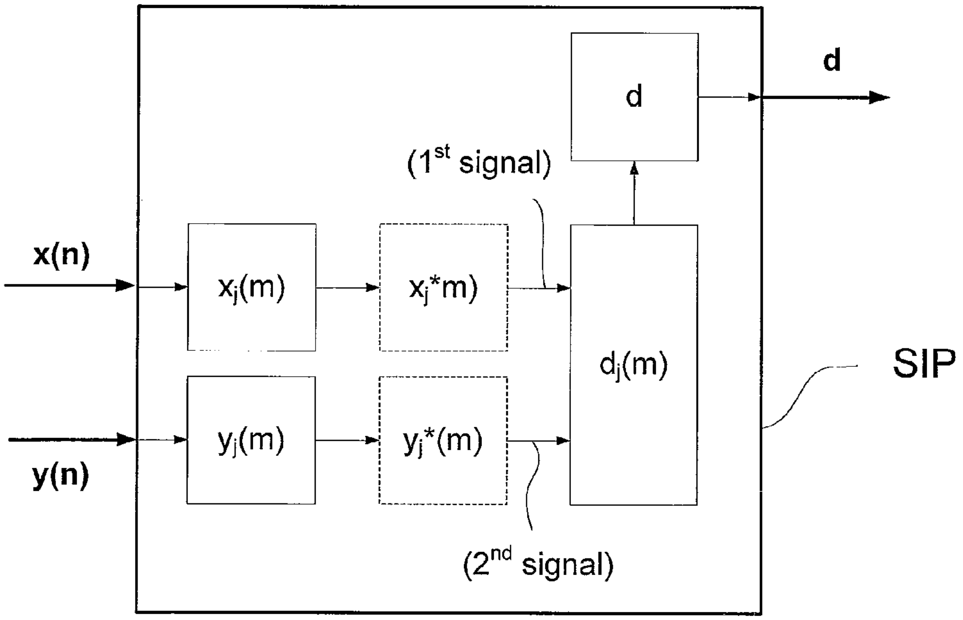

The second signal y can e.g. be a processed version of a target signal x, y=P(x), or a processed version of the target signal plus additional (unprocessed) noise n, y=P(x)+n, or a processed signal of the target signal plus noise, y=P(x+n). Output value d is a final speech intelligibility coefficient (or speech intelligibility predictor value, the two terms being used interchangeably in the present application). FIG. 2*b* illustrates the steps in the determination of the speech intelligibility predictor value d from given first and second inputs x and y. Blocks $x_j(m)$ and $y_j(m)$ represent the generation of the effective amplitudes of the j'th TF unit in frame m of the first and second input signals, respectively. The effective amplitudes may e.g. be implemented by an appropriate filter-bank generating individual time variant signals in sub-bands 1, 2, . . . , J. Alternatively (as generally assumed in the following examples), a Fourier Transform algorithm (e.g. DFT) can be used to generate discrete complex values of the input signal in a number of frequency units k=1, 2, . . . , K and time units m (cf. FIG. 1), thereby providing time-frequency representations x(k,m) and y(k,m) from which the effective amplitudes $x_j(m)$ and $y_j(m)$ can be determined using the formula mentioned above (Eq. 1). Subsequent (optional) blocks $x_j^*(m)$ and $y_j^*(m)$ represent the generation of modified versions of effective amplitudes of the j'th TF unit in frame m of the first and second input signals, respectively. The modification can e.g. comprise normalization (cf. Eq. 2 above) and/or clipping (cf. Eq. 3 above) and/or other scaling operation. The block $d_j(m)$ represent the calculation of intermediate intelligibility coefficient $d_j$ based on first and second intelligibility prediction inputs from the blocks $x_j(m)$ and $y_j(m)$ or optionally from blocks $x_j^*(m)$ and $y_j^*(m)$ (cf. Eq. 4 or Eq. 5 above). Block d provides a speech intelligibility predictor value d based on inputs from block $d_j(m)$ (cf. Eq. 6).

Figure 7:
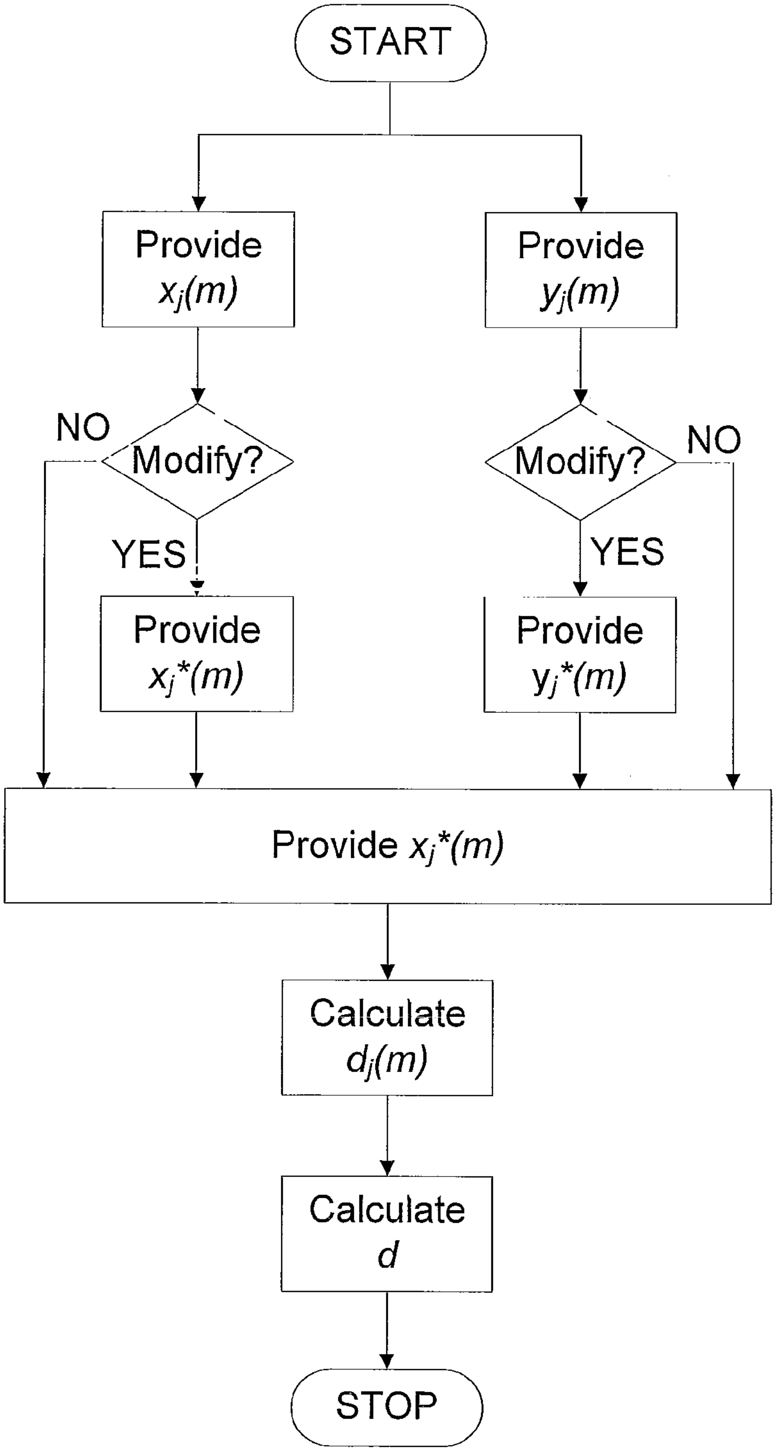
FIG. 7 shows a flow diagram for a speech intelligibility predictor (SIP) algorithm according to the present application.

FIG. 7 shows a flow diagram for a speech intelligibility predictor (SIP) algorithm according to the present application.

Example 1

Online Optimization of Intelligibility Given Noisy Signal(s) Only

Figure 3A:
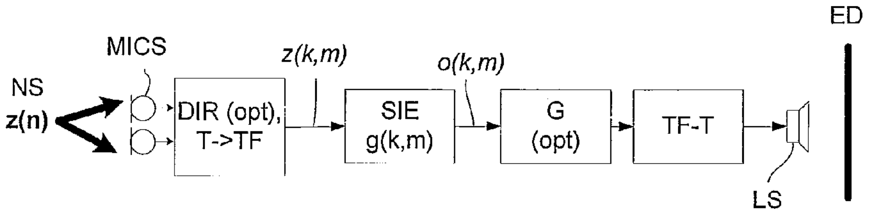
FIG. 3 shows a first embodiment of an audio processing device comprising a speech intelligibility enhancement (SIE) unit according to the present application.

This application is a typical HA application; although we focus here on the HA application, numerous others exist, including e.g. headset or other mobile communication devices. The situation is outlined in the following FIG. 3*a*. FIG. 3*a* represents e.g. a commonly occurring situation where a HA user listens to a target speaker in a noisy environment. Consequently, the microphone(s) of the HA pick up the target speech signal contaminated by noise. A noisy signal is picked up by a microphone system (MICS), optionally a directional microphone system (cf. block DIR (opt) in FIG. 3*a*), converting it to an electric (possibly directional) signal, which is processed to a time frequency representation (cf. T→TF unit in FIG. 3*a*). The goal is to process the noisy speech signal before it is presented at the user's eardrum such that the intelligibility is improved. Let z(n) denote the noisy signal (NS). We assume in the present example that the HA is capable of applying a DFT to successive time frames of the noisy signal leading to DFT coefficients z(k,m) (cf. T-TF block). It should be clear that other methods can be used to obtain the time-frequency division, e.g. filter-banks, etc. The HA processes these noisy TF units by applying a gain value g(k,m) to each time frame, leading to gain modified DFT coefficients o(k,m)=g(k,m)z(k,m) (cf. block SIE g(k,m)). An optional frequency dependent gain, e.g. adapted to a particular user's hearing impairment, may be applied to the improved signal y(k,m) (cf. block G (opt) for applying gains for hearing loss compensation in FIG. 3*a*). Finally, the processed signal to be presented at the eardrum (ED) of the HA user by the output transducer (loudspeaker, LS) is obtained by a frequency-to-time transform (e.g. an inverse DFT) (cf. block TF→T). Alternatively, another output transducer (than a loudspeaker) to present the enhanced output signal to a user can be envisaged (e.g. an electrode of a cochlear implant or a vibrator of a bone conducting device).

In principle, the goal is to find the gain values g(k,m) which maximize the intelligibility predictor value described above (intelligibility coefficient d, cf. Eq. 6). Unfortunately, this is not directly possible in the present case, since in the practical situation at hand, the noise-free target signal x(n) (or equivalently a time-frequency representation $x_j(m)$ or x(k,m)) needed for evaluating the intelligibility predictor for a given choice of gain values g(k,m) is not available, because the available noisy signal z(n) is a sum of the target signal x(n) and a noise signal n(n) from the environment (z(n)=x(n)+n(n)). Instead, we model the signals involved (x(n) and z(n)) statistically. Specifically, if we model the noisy signal z(n) and the (unknown) noise-free signal x(n) as realizations of stochastic processes, as is usually done in statistical speech signal processing, cf. e.g. [9], pp. 143, it is possible to maximize the statistically expected value of the intelligibility coefficient, i.e., $$D = E[d] = E\left[\frac{1}{JM}\sum_{j,m} d_j(m)\right] = \frac{1}{JM}\sum_{j,m} E[d_j(m)], \tag{Eq. 8}$$

where E[•] is the statistical expectation operator. The goal is to maximize the expected intelligibility coefficient D with respect to (wrt.) the gain values g(k,m):

$$\max \frac{1}{JM}\sum_{j,m} E[d_j(m)] wrt.\ g(k, m). \tag{Eq. 9}$$

Figure 3B:
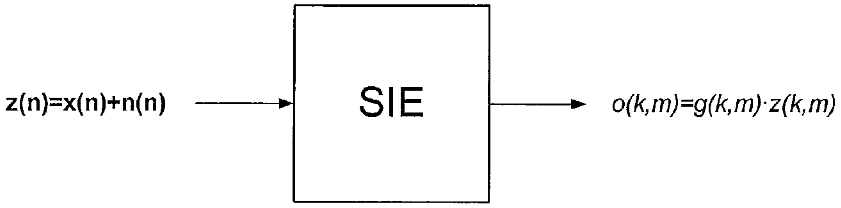

The expected values $E[d_j(m)]$ depend on the probability distribution functions (pdfs) of the underlying random variables, that is z(k,m) (or $z_j(m)$) and x(k,m) (or $x_j(m)$). If the pdfs were known exactly, the gain values g(k,m), which lead to the maximum expected intelligibility coefficient D, could be found either analytically, or at least numerically, depending on the exact details of the underlying pdfs. Obviously, the underlying pdfs are not known exactly, but as described in the following, it is possible to estimate and track them across time. The general principle is sketched in FIG. 3*b*, 3*c* (embodied in speech intelligibility enhancement unit SIE).

Figure 3C:
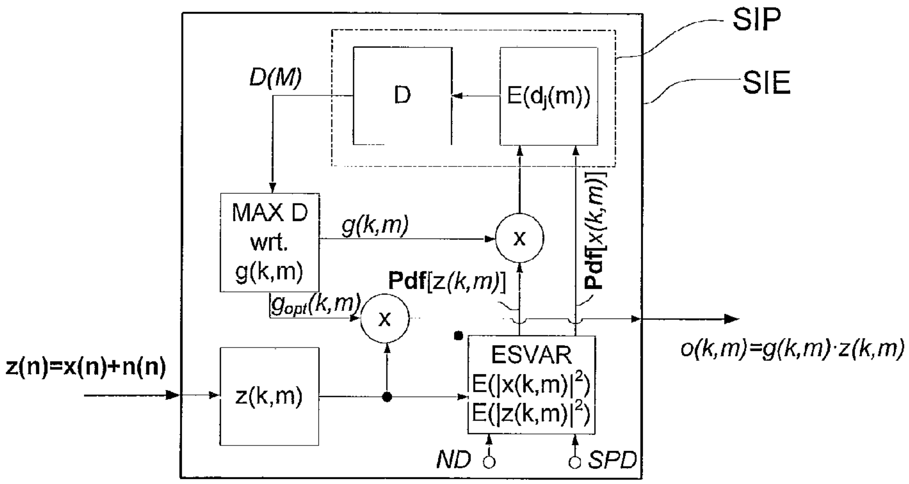

The underlying pdfs are unknown; they deped on the acoustical situation, and must therefore be estimated. Although this is a difficult problem, it is rather well-known in the area of single-channel noise reduction, see e.g. [5], [18] and solutions do exist: It is well-known that the (unknown) clean speech DFT coefficient magnitudes |x(k,m)| can be assumed to have a super-Gaussian (e.g. Laplacian) distribution, see. e.g. [5] (cf. speech-distribution input SPD in FIG. 3*c*). The probability distribution of the noisy observation |z(k,m)| (cf. Pdf[z(k,m)] in FIG. 3*c*) can be derived from the assumption that the noise has a certain probability distribution, e.g. Gaussian (cf. noise-distribution input ND in FIG. 3*c*), and is additive and independent from the target speech x(k,m), an assumption which is often valid in practice, see [4], pp. 151, for details. In order to track the time-behaviour of these (assumed) underlying pdfs, their corresponding variances must be estimated (cf. block ESVAR E(|x(k,m)|$^2$), E(|z(k,m)|$^2$) in FIG. 3*c* for estimating the spectral variances of signals z and x). The variances related to the noise pdfs may be tracked using methods described in e.g. [2,3], while the variances of the target signal may be tracked as described e.g. in [6]. FIG. 3*c* suggests an iterative procedure for finding optimal gain values. The block MAX D g(k,m) in FIG. 3*c* tries out several different candidate gains g(k,m) in order to finally output the optimal gains $g_{opt}$(k,m) for which D is maximized (cf. Eq. 9 above). In practice, the procedure for finding the optimal gain values $g_{opt}$(k,m) may or may not be iterative.

In a hearing aid context, it is necessary to limit the latency introduced by any algorithm to preferably less than 20 ms, say, 5-10 ms. In the proposed framework, this implies that the optimization wrt. the gain values g(k,m) is done up to and including the current frame and including a suitable number of past frames, e.g. M=10-50 frames or more, e.g. 100 or 200 frames or more (e.g. corresponding to the duration of a phoneme or a word or a sentence).

Example 2

Online Optimization of Intelligibility Given Target and Disturbance Signals in Separation The present example applies when target and interference signal(s) are available in separation; although this situation does not arise as often as the one outlined in Example 1, it is still rather general and often arises in the context of mobile communication devices, e.g. mobile telephones, head sets, hearing aids, etc. In the HA context, the situation occurs when the target signal is transmitted wirelessly (e.g. from a mobile phone or a radio or a TV-set) to a HA user, who is exposed to a noisy environment, e.g. driving a car. In this case, the noise from the car engine, tires, passing cars, etc., constitute the interference. The problem is that the target signal presented through the HA loudspeaker is disturbed by the interference from the environment, e.g. due to an open HA fitting, or through the HA vent, leading to a degradation of the target signal-to-interference ratio experienced at the eardrum of the user, and results in a loss of intelligibility. The basic solution proposed here is to modify (e.g. amplify) the target signal before it is presented at the eardrum in such a way that it will be fully (or at least better) intelligible in the presence of the interference, while not being unpleasantly loud. The underlying idea of pre-processing a clean signal to be better perceivable in a noisy environment is e.g. described in [7,8]. In an aspect of the present application, it is proposed to use the intelligibility predictor (e.g. the intelligibility coefficient described above or a parameter derived there from) to find the necessary gain.

The situation is outlined in the following FIG. 4.

It should be understood that the figure represents an example where only functional blocks are shown if they are important for the present discussion of an application in a hearing aid; also, in other applications (e.g. headsets, mobile phones) some of the blocks may not be present. The signal w(n) represents the interference from the environment, which reaches the microphone(s) (MICS) of the HA, but also leaks through to the ear drum (ED). The signal x(n) is the target signal (TS) which is transmitted wirelessly (cf. zig-zag-arrow WLS) to the HA user. The signal w(n) may or may not comprise an acoustic version of the target speech signal x(n) coloured by the transmission path from the acoustic source to the HA (depending on the relevant scenario, e.g. the target signal being sound from a TV-set or sound transmitted from a telephone, respectively).

Figure 4A:
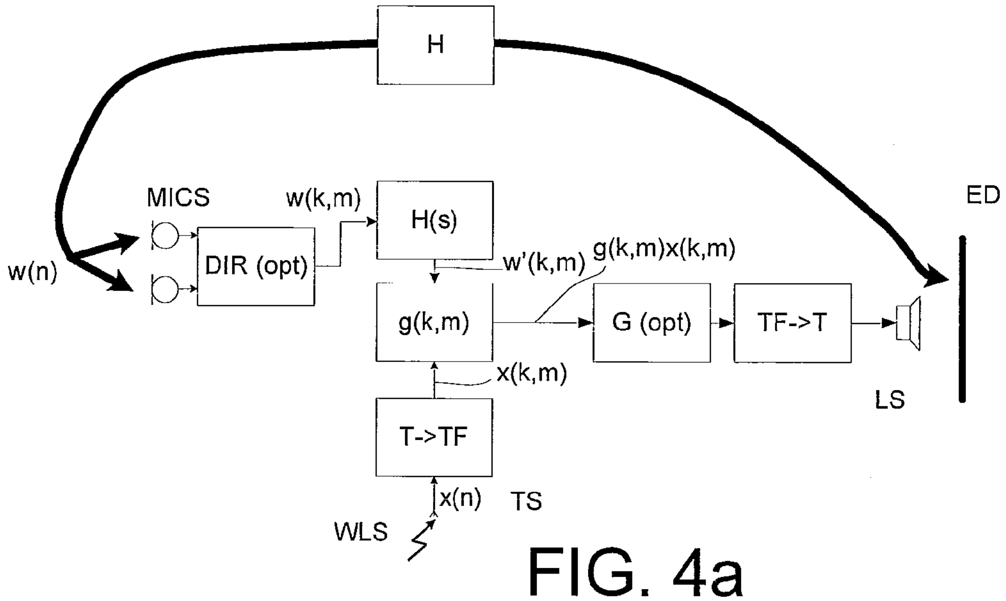
FIG. 4 shows a second embodiment of an audio processing device comprising a speech intelligibility enhancement (SIE) unit according to the present application.
Figure 4B:
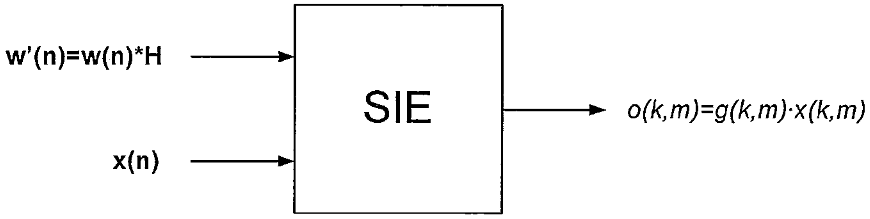
Figure 4C:
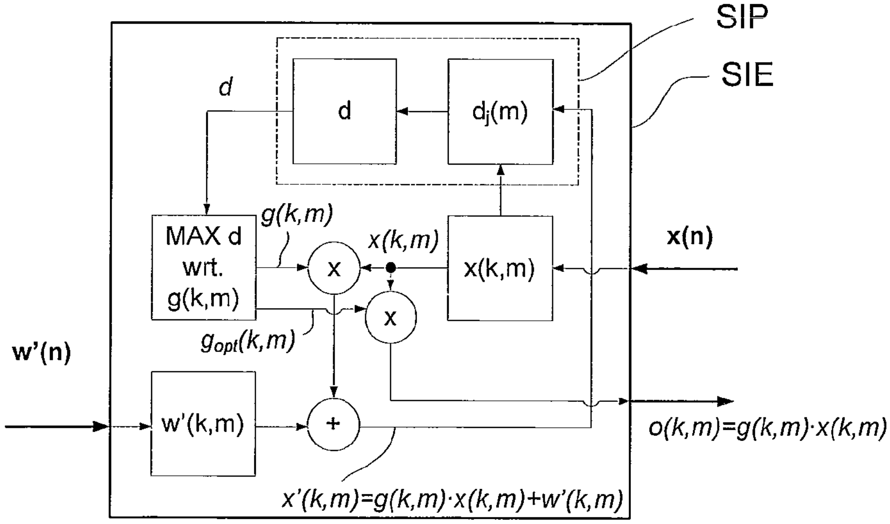
Figure 8:
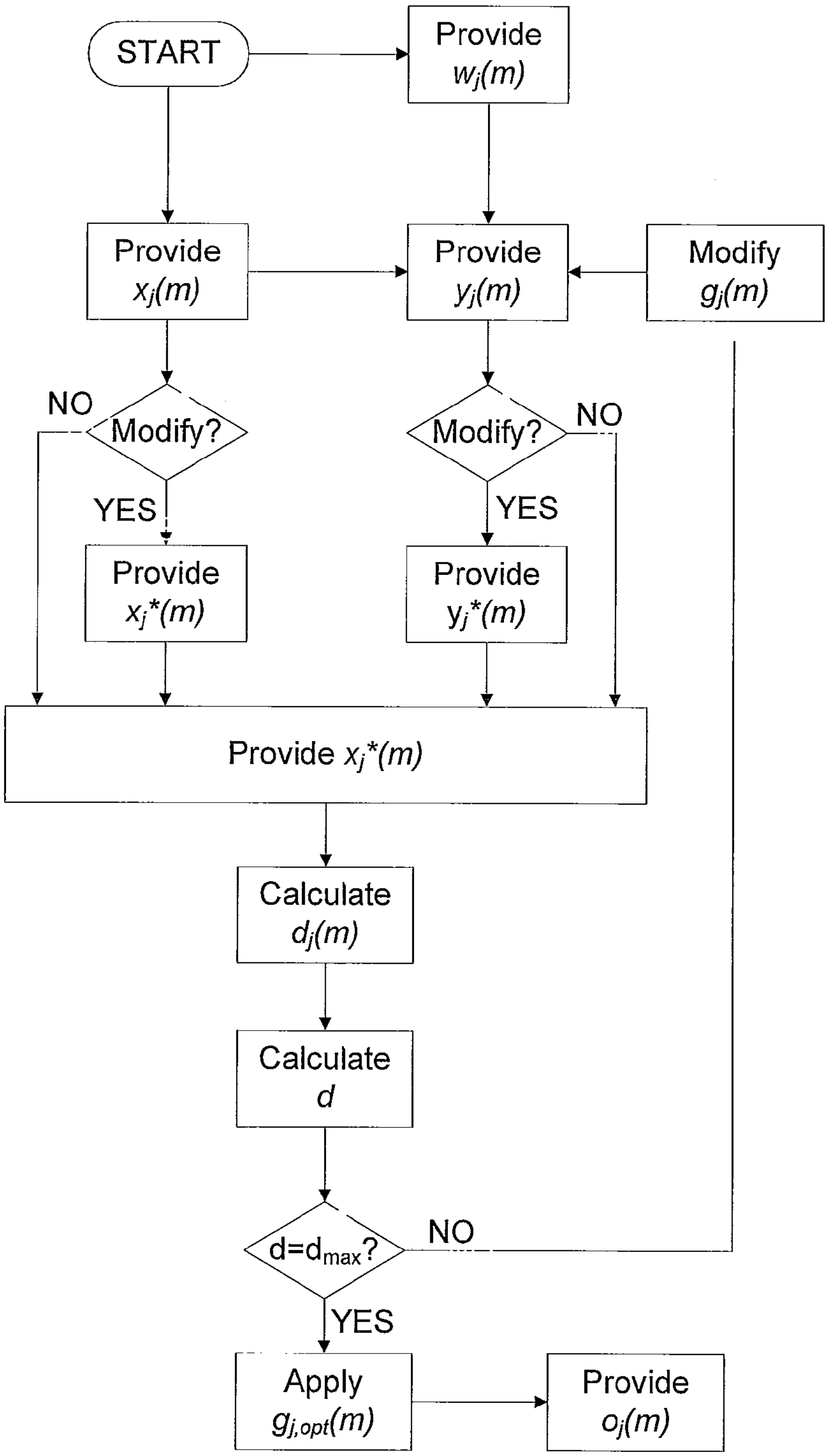
FIG. 8 shows a flow diagram for a speech intelligibility enhancement (SIE) algorithm according to the present application.

The interference signal w(n) is picked up by the microphones (MICS) and passed through some directional system (optional) (cf. block DIR (opt) in FIG. 4*a*); we implicitly assume that the directional system performs a time-frequency decomposition of the incoming signal, leading to time-frequency units w(k,m). In one embodiment, the interference time-frequency units are scaled by the transfer function from the microphone(s) to the ear drum (ED) (cf. block H(s) in FIG. 4*a*) and corresponding time-frequency units w'(k,m) are provided. This transfer function may be a general person-independent transfer function, or a personal transfer function, e.g. measured during the fitting process (i.e. taking account of the acoustic signal path from a microphone (e.g. located in a behind the ear part or in an in the ear part) to the ear-drum, e.g. due to vents or other 'openings'. Consequently, the time-frequency units w'(k,m) represent the interference signal as experienced at the eardrum of the user. Similarly, the wirelessly transmitted target signal x(n) is decomposed into time-frequency units x(k,m) (cf. T-TF unit in FIG. 4*a*). The gain block (cf. g(k,m) in FIG. 4*a*) is adapted to apply gains to the time-frequency representation x(k,m) of the target signal to compensate for the noisy environment. In this adaptation process, the intelligibility of the target signal can be estimated using the intelligibility prediction algorithm (SIP, cf. e.g. FIG. 2) above where g(k,m)·x(k,m)+w'(k,m) and x(k,m) are used as noisy/processed and target signal, respectively (cf. e.g. speech intelligibility enhancement unit SIE in FIG. 4*b*, 4*c*). FIG. 4*c* suggests an iterative procedure for finding optimal gain values. The block MAX d wrt. g(k,m) in FIG. 4*c* tries out several different candidate gains g(k,m) in order to finally output the optimal gains $g_{opt}$(k,m) for which d is maximized (cf. Eq. 6 above). FIG. 8 shows a flow diagram for a speech intelligibility enhancement (SIE) algorithm according to the present application (as also illustrated in FIG. 4*c*) using an iterative procedure for determining an improved output signal $o_j$(m) (optimized gains $g_{j,opt}$(m) providing $d_{j,max}$(m) applied to the target signal xj(m) providing the improved output signal $o_j(m)=g_{j,opt}(m)x_j(m)$). In practice, the procedure for finding the optimal gain values $g_{opt}$(k,m) ($g_{j,opt}$(m)) may or may not be iterative.

If the interference level w'(k,m) is low enough, the resulting intelligibility score will be above a certain threshold, say λ=95%, and the wirelessly transmitted target x(n) will be presented unaltered to the hearing aid user, that is g(k,m)=1 in this case. If, on the other hand, the interference level is high such that the predicted intelligibility is less than the threshold λ, then the target signal must be modified (e.g. amplified) by multiplying gains g(k,m) onto the target signal x(k,m) in order to change the magnitude in relevant frequency regions and consequently increase intelligibility beyond λ. Typically, g(k,m) is a real-value, and x(k,m) is a complex-valued DFT-coefficient. Multiplying the two, hence results in a complex number with an increased magnitude and an unaltered phase. There are many ways in which reasonable g(k,m) values can be determined. To give an example, we assume that the gain values satisfy g(k,m)>1 and impose the following two constraints when finding the gain values g(k,m):

A) The gain should not make the target signal unacceptably loud, that is, there is a known upper limit γ(k,m) for each gain value, i.e., g(k,m)<γ(k,m). The threshold γ(k,m) can e.g. be determined from knowledge of the uncomfortable-level of the user (and e.g. be provided, e.g. stored in a memory of the hearing aid, during a fitting process).

B) We wish to change the incoming signal x(n) as little as possible (according to the understanding that any change of x(n) may introduce artefacts in the target presented at the ear drum).

In principle, the g(k,m) values can be found through the following iterative procedure, e.g. executed for each time frame m:

1) Set g(k,m)=1 for all k.
2) Compute an estimate of the processed signal experienced at the eardrum of the user: x'(k,m)=g(k,m)x(k,m)+w'(k,m).
3) Compute resulting intelligibility score D' using x(k,m) and x'(k,m) as target and processed/noisy signal, respectively (using e.g. equations Eq: 4 or 5, 6, 7).
4) If the resulting intelligibility score is more than a threshold value λ (e.g. λ=95%): Stop.
5) If the resulting intelligibility score is less than 2: Determine the frequency index k for which the target-to-interference ratio is smallest:

$$k^* = \underset{k}{\operatorname{argmin}} \frac{|s'(k,m)|^2}{|w'(k,m)|^2}$$

$$k = 1, \ldots, K.$$

Increase the gain at this frequency by a predefined amount, e.g. 1 dB, i.e., g(k*,m)=g(k*,m)*1.12
6) If g(k*,m)≤γ(k*,m), go to step 2
Otherwise: stop Having determined in this way the "smallest" values of g(k,m) which lead to acceptable intelligibility, the resulting time-frequency units g(k,m)·x(k,m) may be passed through a hearing loss compensation unit (i.e. additional, frequency-dependent gains are applied to compensate for a hearing loss, cf. block G (opt) in FIG. 4*a*), before the time-frequency units are transformed to the time domain (cf. block TF→T) and presented for the user through a loudspeaker (LS). Although the intelligibility predictor [1] is validated for normal hearing subjects only, the proposed method is reasonable for hearing impaired subjects as well, under the idealized assumption that the hearing loss compensation unit compensates perfectly for the hearing loss.

Example 2.1

Wireless Microphone to Listening Device (e.g. Teaching Scenario)

Figure 5A:
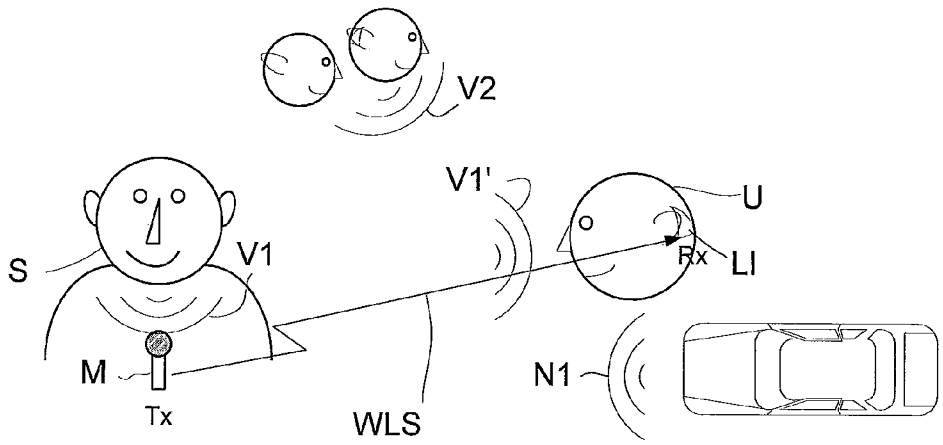
FIG. 5 shows three application scenarios of a second embodiment of an audio processing device according to the present application.

FIG. 5*a* illustrates a scenario, where a user U wearing a listening instrument LI receives a target speech signal x in the form of a direct electric input via wireless link WLS from a microphone M (the microphone comprising antenna and transmitter circuitry Tx) worn by a speaker S producing sound field V1. A microphone system of the listening instrument picks up a mixed signal comprising sounds present in the local environment of the user U, e.g. (A) a propagated (i.e. a 'coloured' and delayed) version V1' of the sound field V1, (B) voices V2 from additional talkers (symbolized by the two small heads in the top part of FIG. 5*a*) and (C) sounds N1 from other noise sources, here from nearby traffic (symbolized by the car in lower right part of FIG. 5*a*). The audio signal of the direct electric input (the target speech signal x) and the mixed acoustic signals of the environment picked up by the listening instrument and converted to an electric microphone signal are subject to a speech intelligibility algorithm as described by the present teaching and executed by a signal processing unit of the listening instrument (and possibly further processed, e.g. to compensate for a wearers hearing impairment and/or to provide noise reduction, etc.) and presented to the user U via an output transducer (e.g. a loudspeaker, e.g. included in the listening instrument), cf. e.g. FIG. 4*a*. The listening instrument can e.g. be a headset or a hearing instrument or an ear piece of a telephone or an active ear protection device or a combination thereof. The direct electric input received by the listening instrument LI from the microphone is used as a first signal input (x) to a speech intelligibility enhancement unit (SIE) of the listening instrument and the mixed acoustic signals of the environment picked up by the microphone system of the listening instrument is used as a second input (w or w') to the speech intelligibility enhancement unit, cf. FIG. 4*b*, 4*c*.

Example 2.2

Cellphone to Listening Device Via Intermediate Device (e.g. Private Use Scenario)

Figure 5B:
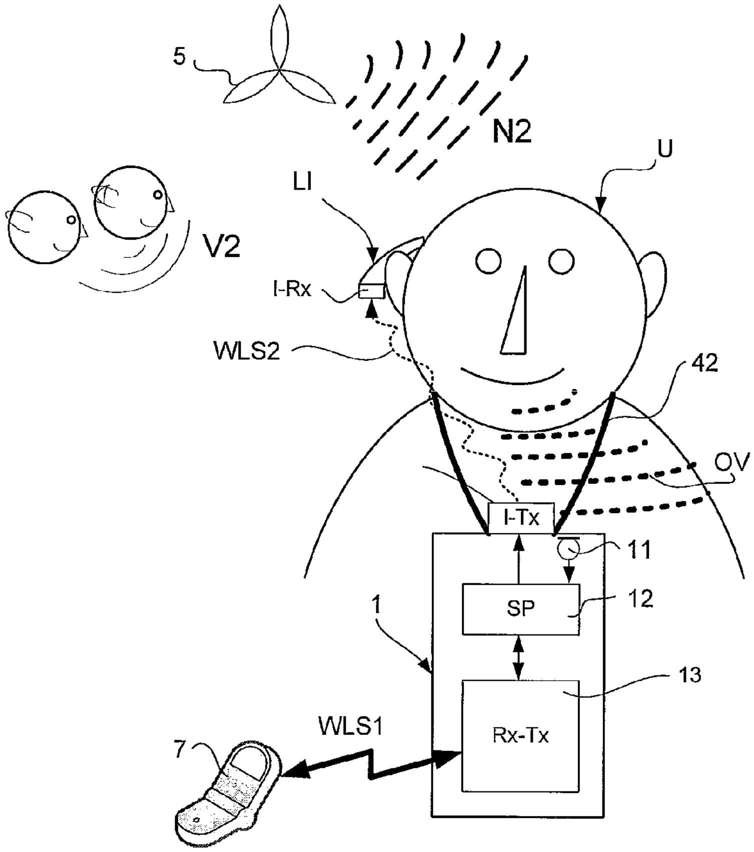

FIG. 5*b* illustrates a listening system comprising a listening instrument LI and a body worn device, here a neck worn device 1. The two devices are adapted to communicate wirelessly with each other via a wired or (as shown here) a wireless link WLS2. The neck worn device 1 is adapted to be worn around the neck of a user in neck strap 42. The neck worn device 1 comprises a signal processing unit SP, a microphone 11 and at least one receiver for receiving an audio signal, e.g. from a cellular phone 7 as shown. The neck worn device comprises e.g. antenna and transceiver circuitry (cf. link WLS1 and Rx-Tx unit in FIG. 5*b*) for receiving and possibly demodulating a wirelessly received signal (e.g. from telephone 7) and for possibly modulating a signal to be transmitted (e.g. as picked up by microphone 11) and transmitting the (modulated) signal (e.g. to telephone 7), respectively. The listening instrument LI and the neck worn device 1 are connected via a wireless link WLS2, e.g. an inductive link (e.g. two-way or as here a one-way link), where an audio signal is transmitted via inductive transmitter I-Tx of the neck worn device 1 to the inductive receiver I-Rx of the listening instrument LI. In the present embodiment, the wireless transmission is based on inductive coupling between coils in the two devices or between a neck loop antenna (e.g. embodied in neck strap 42), e.g. distributing the field from a coil in the neck worn device (or generating the field itself) and the coil of the listening instrument (e.g. a hearing instrument). The body or neck worn device 1 may together with the listening instrument constitute the listening system. The body or neck worn device 1 may constitute or form part of another device, e.g. a mobile telephone or a remote control for the listening instrument LI or an audio selection device for selecting one of a number of received audio signals and forwarding the selected signal to the listening instrument LI. The listening instrument LI is adapted to be worn on the head of the user U, such as at or in the ear of the user U (e.g. in the form of a behind the ear (BTE) or an in the ear (ITE) hearing instrument). The microphone 11 of the body worn device 1 can e.g. be adapted to pick up the user's voice during a telephone conversation and/or other sounds in the environment of the user. The microphone 11 can e.g. be manually switched off by the user U.

The listening system comprises a signal processor adapted to run a speech intelligibility algorithm as described in the present disclosure for enhancing the intelligibility of speech in a noisy environment. The signal processor for running the speech intelligibility algorithm may be located in the body worn part (here neck worn device 1) of the system (e.g. in signal processing unit SP in FIG. 5*b*) or in the listening instrument LI. A signal processing unit of the body worn part 1 may possess more processing power than a signal processing unit of the listening instrument LI, because of a smaller restraint on its size and thus on the capacity of its local energy source (e.g. a battery). From that aspect, it may be advantageous to perform all or some of the speech intelligibility processing in a signal processing unit of the body worn part (1 in FIG. 5*b*). In an embodiment, the listening instrument LI comprises a speech intelligibility enhancement unit (SIE) taking the direct electric input (e.g. an audio signal from cell phone 7 provided by links WLS1 and WLS2) from the body worn part 1 as a first signal input (x) and the mixed acoustic signals (N2, V2, OV) from the environment picked up by the microphone system of the listening instrument LI as a second input (w or w') to the speech intelligibility enhancement unit, cf. FIG. 4*b*, 4*c*.

Sources of acoustic signals picked up by microphone 11 of the neck worn device 1 and/or the microphone system of the listening instrument LI are in the example of FIG. 5*b* indicated to be 1) the user's own voice OV, 2) voices V2 of persons in the user's environment, 3) sounds N2 from noise sources in the user's environment (here shown as a fan). Other sources of 'noise' (when considered with respect to the directly received target speech signal x can of course be present in the user's environment.

The application scenario can e.g. include a telephone conversation where the device from which a target speech signal is received by the listening system is a telephone (as indicated in FIG. 5*b*). Such conversation can be conducted in any acoustic environment, e.g. a noisy environment, such as a car (cf. FIG. 5*c*) or another vehicle (e.g. an aeroplane) or in a noisy industrial environment with noise from machines or in a call centre or other open-space office environment with disturbances in the form of noise from other persons and/or machines.

The listening instrument can e.g. be a headset or a hearing instrument or an ear piece of a telephone or an active ear protection device or a combination thereof. An audio selection device (body worn or neck worn device 1 in Example 2.2), which may be modified and used according to the present invention is e.g. described in EP 1 460 769 A1 and in EP 1 981 253 A1 or WO 2008/125291 A2.

Example 2.3

Cellphone to Listening Device (Car Environment Scenario)

Figure 5C:
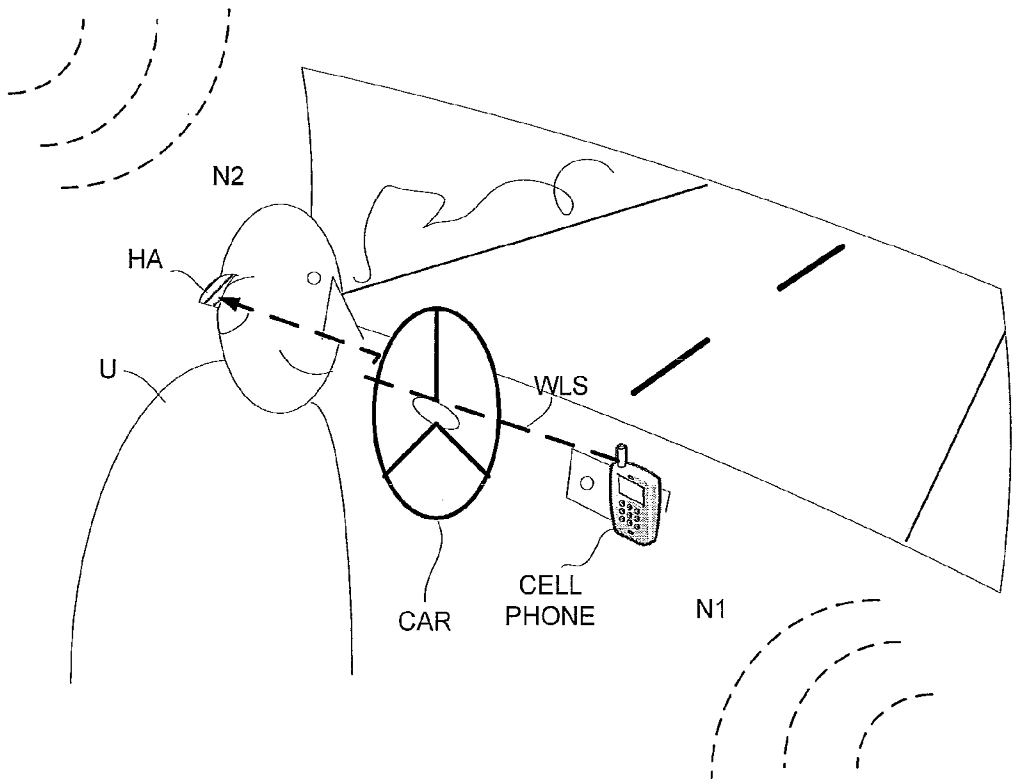

FIG. 5*c* shows a listening system comprising a hearing aid (HA) (or a headset or a head phone) worn by a user U and an assembly for allowing a user to use a cellular phone (CELL-PHONE) in a car (CAR). A target speech signal received by the cellular phone is transmitted wirelessly to the hearing aid via wireless link (WLS). Noises (N1, N2) present in the user's environment (and in particular at the user's ear drum), e.g. from the car engine, air noise, car radio, etc. may degrade the intelligibility of the target speech signal. The intelligibility of the target signal is enhanced by a method as described in the present disclosure. The method is e.g. embodied in an algorithm adapted for running (executing the steps of the method) on a signal processor in the hearing aid (HA). In an embodiment, the listening instrument LI comprises a speech intelligibility enhancement unit (SIE) taking the direct electric input from the CELL PHONE provided by link WLS as a first signal input (x) and the mixed acoustic signals (N1, N2) from the auto environment picked up by the microphone system of the listening instrument LI as a second input (w or w') to the speech intelligibility enhancement unit, cf. FIG. 4*b*, 4*c*.

The application scenarios of Example 2.1, 2.2 and 2.3 all comply with the scenario outlined in Example 2, where the target speech signal is known (from a direct electric input, e.g. a wireless input), cf. FIG. 4. Even though the 'clean' target signal is known, the intelligibility of the signal can still be improved by the speech intelligibility algorithm of the present disclosure when the clean target signal is mixed with or replayed in a noisy acoustic environment.

Example 3

Algorithm Development

Figure 6:
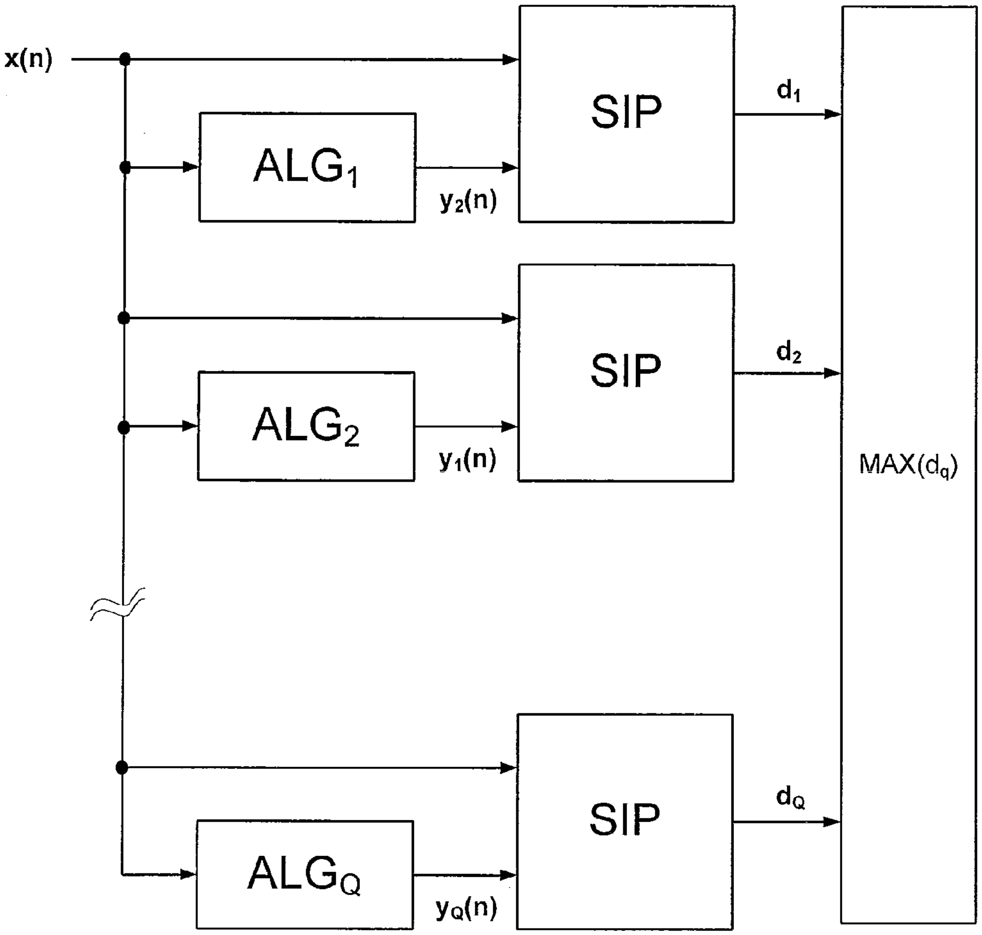
FIG. 6 shows an embodiment of an off-line processing algorithm procedure comprising a speech intelligibility predictor (SIP) unit according to the present application.

FIG. 6 shows an application of the intelligibility prediction algorithm for an off-line optimization procedure, where an algorithm for processing an input signal and providing an output signal is optimized by varying one or more parameters of the algorithm to obtain the parameter set leading to a maximum intelligibility predictor value $d_{max}$. This is the simplest application of the intelligibility predictor algorithm, where the algorithm is used to judge the impact on intelligibility of other algorithms, e.g. noise reduction algorithms. Replacing listening tests with this algorithm allows automatic and fast tuning of various HA parameters. This can e.g. be of value in a development phase, where different algorithms with different functional tasks are combined and where parameters or functions of individual algorithms are modified.

Different variants $ALG_1, ALG_2, \ldots, ALG_Q$ of an algorithm ALG (e.g. having different parameters or different functions, etc.) are fed with the same (clean) target speech signal x(n). The target speech signal is processed by algorithms $ALG_q$ ($q=1, 2, \ldots, Q$) resulting in processed versions $y_1, y_2, \ldots, y_Q$ of the target signal x. A signal intelligibility predictor SIP as described in the present application is used to provide an intelligibility measure $d_1, d_2, \ldots, d_Q$ of each of the processed versions $y_1, y_2, \ldots, y_Q$ of the target signal x. By identifying the maximum final intelligibility predictor value $d_{max}=d_q$ among the Q final intelligibility predictors $d_1, d_2, \ldots, d_Q$ (cf. block MAX($d_q$)), the algorithm ALGq is identified as the one providing the best intelligibility (with respect to the target signal x(n)). Such scheme can of course be extended to any number of variants of the algorithm, can be used in different algorithms (e.g. noise reduction, directionality, compression, etc.), may include an optimization among different target signals, different speakers, different types of speakers (e.g. male, female or child speakers), different languages, etc. In FIG. 6, the different intelligibility tests resulting in predictor values $d_1$ to $d_Q$ are shown to be performed in parallel. Alternatively, they may be formed sequentially.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. Other applications of the speech intelligibility predictor and enhancement algorithms described in the present application than those mentioned in the above examples can be proposed, for example automatic speech recognition systems, e.g. voice control systems, classroom teaching systems, etc.

REFERENCES

1. C. H. Taal, R. C. Hendriks, R. Heusdens, and J. Jensen, "A Short-Time Objective Intelligibility Measure for Time-Frequency Weighted Noisy Speech," IEEE International Conference on Acoustics, Speech, and Signal Processing (ICASSP), 14-19 Mar. 2010. pp. 4214-4217.
2. R. Martin, "Noise Power Spectral Density Estimation Based on Optimal Smoothing and Minimum Statistics," IEEE Trans. Speech, Audio Proc., Vol. 9, No. 5, July 2001, pp. 504-512.
3. R. C. Hendriks, R. Heusdens and J. Jensen, "MMSE Based Noise Psd Tracking With Low Complexity", IEEE International Conference on Acoustics, Speech, and Signal Processing, March 2010, Accepted.
4. P. C. Loizou, "Speech Enhancement—Theory and Practice," CRC Press, 2007.
5. R. Martin, "Speech Enhancement Based on Minimum Mean-Square Error Estimation and Supergaussian Priors," IEEE Trans. Speech, Audio Processing, Vol. 13, Issue 5, September 2005, pp. 845-856.
6. Y. Ephraim and D. Malah, "Speech Enhancement Using a Minimum Mean-Square Error Short-Time Spectral Amplitude Estimator," IEEE Trans. Acoustics, Speech, Signal Proc., ASSP-32(6), 1984, pp. 1109-121.
7. A. C. Dominguez, "Pre-Processing of Speech Signals for Noisy and Band-Limited Channels," Master's Thesis, KTH, Stockholm, Sweden, March 2009
8. B. Sauert and P. Vary, "Near end listening enhancement optimized with respect to speech intelligibility," Proc. 17th European Signal Processing Conference (EUSIPCO), pp. 1844-1849, 2009
9. J. R. Deller, J. G. Proakis, and J. H. L. Hansen, "Discrete-Time Processing of Speech Signals," IEEE Press, 2000.
10. U.S. Pat. No. 5,473,701 (AT&T) 5 Dec. 1995
11. WO 99/09786 A1 (PHONAK) 25 Feb. 1999
12. EP 2 088 802 A1 (OTICON) 12 Aug. 2009
13. EP 1 460 769 A1 (PHONAK) 22 Sep. 2004
14. EP 1 981 253 A1 (OTICON) 15 Oct. 2008
15. WO 2008/125291 A2 (OTICON) 23 Oct. 2008
16. S. van Gerven and F. Xie, "A comparative study of speech detection methods," in Proc. Eurospeech, 1997, vol. 3, pp. 1095-1098.
17. J. Sohn, N. S. Kim, and W. Subg, "A statistical model-based voice activity detection," IEEE Signal Processing Letters, vol. 6, pp. 1-3, January 1999.
18. A. Kawamura, W. Thanhikam, and Y. Iguni, "A speech spectral estimator using adaptive speech probability density function," Proc. Eusipco 2010, pp. 1549-1552.

The invention claimed is:

1. A method of providing a speech intelligibility predictor value for estimating an average listener's ability to understand a target speech sound when said target speech sound is subject to a processing algorithm and/or is received in a noisy environment, the method comprising:

electrically receiving a first signal x(n) representing the target speech sound as a target speech signal;

a) providing a time-frequency representation, $x_j(m)$, of the first signal x(n), representing the target speech signal in a number of frequency bands and a number of time instances, j being a frequency band index and m being a time index;

b) providing a time-frequency representation, $y_j(m)$, of a second signal y(n), the second signal being a noisy and/or processed version of said target speech signal in a number of frequency bands and a number of time instances;

c) providing first and second intelligibility prediction inputs in the form of modified time-frequency representations $x_j^*(m)$ and $y_j^*(n)$ of the first and second signals or signals derived there from, respectively;

d) providing time-frequency dependent intermediate speech intelligibility coefficients $d_j(m)$ based on said first and second intelligibility prediction inputs;

e) calculating a final speech intelligibility predictor d by averaging said intermediate speech intelligibility coefficients $d_j(m)$ over a number J of frequency indices and a number M of time indices;

wherein the speech intelligibility coefficients $d_j(m)$ at given time instants m are calculated as $$d_j(m) = \frac{\sum_{n=N1}^{N2} \left(x_j^*(n) - r_{x_j^*}\right)\left(y_j^*(n) - r_{y_j^*}\right)}{\sqrt{\sum_{n=N1}^{N2} \left(x_j^*(n) - r_{x_j^*}\right)^2 \sum_{n=N1}^{N2} \left(y_j^*(n) - r_{y_j^*}\right)^2}}$$

where $x_j^*(n)$ and $y_j^*(n)$ are effective amplitudes of the j'th time-frequency unit at time instant n of the first and second intelligibility prediction inputs, respectively, and where $N1 \leq m \leq N2$, $r_{x*j}$ and $r_{y*j}$ are constants, and $N2-N1 \leq 400$ ms.

2. A method according to claim 1 wherein M is larger than or equal to N=(N2−N1)+1.

3. A method according to claim 1 wherein the number M of time indices is determined with a view to a typical length of a phoneme or a word or a sentence.

4. A method according to claim 1 wherein $$r_{x_j^*} = \mu_{x_j^*} = \frac{1}{N}\sum_{l=N1}^{N2} x_j^*(l) \text{ and } r_{y_j^*} = \mu_{y_j^*} = \frac{1}{N}\sum_{l=N1}^{N2} y_j^*(l)$$

are average values of the effective amplitudes of signals x* and y* over N=N2−N1+1 time instances.

5. A method according to claim 1 where the effective amplitudes $y^*_j(m)$ of the second intelligibility prediction input are normalized versions of the second signal with respect to the target signal $x_j(m)$, $y^*_j = \tilde{y}_j = y_j(m)\cdot\alpha_j(m)$, where the normalization factor $\alpha_3$ is given by $$\alpha_j(m) = \left(\frac{\sum_{n=m-N+1}^{m} x_j(n)^2}{\sum_{n=m-N+1}^{m} y_j(n)^2}\right)^{\frac{1}{2}}.$$

6. A method according to claim 5 where the normalized effective amplitudes $\tilde{y}_j$ of the second signal are clipped to provide clipped effective amplitudes $y^*_j$, where $$y_j^*(m) = \max(\min(\tilde{y}_j(m), x_j(m) + 10^{-\beta/20} x_j(m)), x_j(m) - 10^{-\beta/20} x_j(m)),$$

to ensure that the local target-to-interference ratio does not exceed β dB.

7. A method according to claim 1 wherein the final intelligibility predictor d is transformed to an intelligibility score D' by applying a logistic transformation to d of the form $$D' = \frac{100}{1+\exp(ad+b)},$$

where a and b are constants.

8. A method of improving a listener's understanding of a target speech signal in a noisy environment, the method comprising a) Providing a final speech intelligibility predictor d according to the method of claim 1;

b) Determining an optimized set of time-frequency dependent gains $g_j(m)_{opt}$, which when applied to the first or second signal or to a signal derived there from, provides a maximum final intelligibility predictor $d_{max}$, c) Applying said optimized time-frequency dependent gains $g_j(m)_{opt}$ to said first or second signal or to a signal derived there from, thereby providing an improved signal $o_j(m)$.

9. A method according to claim 8 wherein said first signal x(n) is provided to the listener in a mixture with noise from said noisy environment in form of a mixed signal z(n).

10. A method according to claim 8 comprising b1) Providing a statistical estimate of the electric representations x(n) of the first signal and z(n) of the mixed signal, d1) Using the statistical estimates of the first and mixed signal to estimate said intermediate speech intelligibility coefficients $d_j(m)$.

11. A method according to claim 10 wherein the step of providing a statistical estimate of the electric representations x(n) and z(n) of the first and mixed signal, respectively, comprises providing an estimate of the probability distribution functions of the underlying time-frequency representation $x_j(m)$ and $z_j(m)$ of the first and mixed signal, respectively.

12. A method according to claim 10, wherein the final speech intelligibility predictor is maximized using a statistically expected value D of the intelligibility coefficient, where $$D = E[d] = E\left[\frac{1}{JM}\sum_{j,m} d_j(m)\right] = \frac{1}{JM}\sum_{j,m} E[d_j(m)],$$

and where E[•] is the statistical expectation operator and where the expected values $E[d_j(m)]$ depend on statistical estimates of the underlying random variables $x_j(m)$.

13. A method according to claim 8 wherein a time-frequency representation $z_j(m)$ of said mixed signal z(n) is provided.

14. A method according to claim 13 wherein said optimized set of time-frequency dependent gains $g_j(m)_{opt}$ are applied to said mixed signal $z_j(m)$ to provide said improved signal $o_j(m)$.

15. A method according to claim 14, wherein said second signal comprises said improved signal $o_j(m)$.

16. A method according to claim 8 wherein said first signal x(n) is provided to the listener as a separate signal.

17. A method according to claim 16 wherein a noise signal w(n) comprising noise from the environment is provided to the listener.

18. A method according to claim 17 wherein said noise signal w(n) is transformed to a signal w'(n) representing the noise from the environment at the listener's eardrum.

19. A method according to claim 17 wherein a time-frequency representation $w_j(m)$ of said noise signal w(n) or said transformed noise signal w'(n) is provided.

20. A method according to claim 16 wherein said optimized set of time-frequency dependent gains $g_j(m)_{opt}$ are applied to the first signal $x_j(m)$ to provide said improved signal $o_j(m)$.

21. A method according to claim 20 wherein said second signal comprises said improved signal $o_j(m)$ and said noise signal $w_j(m)$ or $w'_j(m)$ comprising noise from the environment.

22. A tangible non-transitory computer-readable medium storing a computer program comprising program code instructions for causing a data processing system to perform all of the steps of the method of claim 1, when said computer program is executed on the data processing system.

23. A data processing system, comprising:

a processor configured to perform all of the steps of the method of claim 1.

24. A data processing system according to claim 23, wherein the processor is a processor of an audio processing device.

25. The method according to claim 1, wherein the electrically receiving the first signal x(n) is provided by a microphone.

26. A speech intelligibility predictor (SIP) unit adapted for receiving a first signal x representing a target speech signal and a second noise signal y being either a noisy and/or processed version of the target speech signal, and for providing as an output a speech intelligibility predictor value d for the second signal, the speech intelligibility predictor unit comprising:

a) a time to time-frequency conversion (T-TF) unit adapted for i) providing a time-frequency representation $x_j(m)$ of a first signal x(n) representing said target speech signal in a number of frequency bands and a number of time instances, j being a frequency band index and m being a time index; and ii) providing a time-frequency representation $y_j(m)$ of a second signal y(n), the second signal being a noisy and/or processed version of said target speech signal in a number of frequency bands and a number of time instances;

b) a transformation unit adapted for providing first and second intelligibility prediction inputs in the form of time-frequency representations $x_j^*(m)$ and $y_j^*(m)$ of the first and second signals or signals derived there from, respectively;

c) an intermediate speech intelligibility calculation unit adapted for providing time-frequency dependent intermediate speech intelligibility coefficients $d_j(m)$ based on said first and second intelligibility prediction inputs;

d) a final speech intelligibility calculation unit adapted for calculating a final speech intelligibility predictor d by averaging said intermediate speech intelligibility coefficients $d_j(m)$ over a predefined number J of frequency indices and a predefined number M of time indices, wherein the speech intelligibility coefficients $d_j(m)$ at given time instants m are calculated as $$d_j(m) = \frac{\sum_{n=N1}^{N2}\left(x_j^*(n) - r_{x_j^*}\right)\left(y_j^*(n) - r_{y_j^*}\right)}{\sqrt{\sum_{n=N1}^{N2}\left(x_j^*(n) - r_{x_j^*}\right)^2 \sum_{n=N1}^{N2}\left(y_j^*(n) - r_{y_j^*}\right)^2}}$$

where $x_j^*(n)$ and $y_j^*(n)$ are the effective amplitudes of the j'th time-frequency unit at time instant n of the first and second intelligibility prediction inputs, respectively, and where $N1 \leq m \leq N2$ and $r_{x^*j}$ and $r_{y^*j}$ are constants, and $N2-N1 \leq 400$ ms.

27. A speech intelligibility enhancement (SIE) unit adapted for receiving EITHER (A) a target speech signal x and (B) a noise signal w OR (C) a mixture z of a target speech signal and a noise signal, and for providing an improved output o with improved intelligibility for a listener, the speech intelligibility enhancement unit comprising a. A speech intelligibility predictor unit according to claim 26;

b. A time to time-frequency conversion (T-TF) unit for i) Providing a time-frequency representation $w_j(m)$ of said noise signal w(n) OR $z_j(m)$ of said mixed signal z(n) in a number of frequency bands and a number of time instances;

c) An intelligibility gain (IG) unit for i) Determining an optimized set of time-frequency dependent gains $g_j(m)_{opt}$, which when applied to the first or second signal or to a signal derived there from, provides a maximum final intelligibility predictor $d_{max}$;

ii) Applying said optimized time-frequency dependent gains $g_j(m)_{opt}$ to said first or second signal or to a signal derived there from, thereby providing an improved signal $o_j(m)$.

* * * * *